Sept. 10, 1968    E. G. FREDERICK ET AL    3,401,042
RIVETED OR EYELETED END CLOSURE FOR SAUSAGE CASINGS
Filed Dec. 2, 1964    2 Sheets-Sheet 1

EUGENE G. FREDERICK
LEONARD C. MEREDITH
INVENTOR.

BY
THEIR ATTORNEY

United States Patent Office 3,401,042
Patented Sept. 10, 1968

3,401,042
RIVETED OR EYELETED END CLOSURE
FOR SAUSAGE CASINGS
Eugene G. Frederick, Beverly, and Leonard C. Meredith,
Marblehead, Mass., assignors to Tee-Pak, Inc., Chicago, Ill., a corporation of Illinois
Filed Dec. 2, 1964, Ser. No. 415,302
2 Claims. (Cl. 99—176)

ABSTRACT OF THE DISCLOSURE

A clear cellulosic casing or fiber reinforced cellulosic casing is pleated at one end and the pleats compressed. The compressed and pleated portion has a hole formed therein which is free from cuts and tears. A casing hanger is positioned adjacent to the hole in the pleated and compressed end. A solid rivet or an eyelet is positioned through the hole and compressed to secure the compressed and pleated portion of the casing together and secure the hanger to the casing. The casing hanger may be a string or may be a strap, preferably of a material of high tear strength such as polypropylene.

Figure 1:
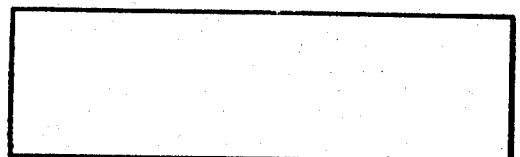

This invention relates to new and useful improvements in methods of closing the ends of cellulosic sausage casings used in the preparation of large diameter sausages and to the novel products produced by this method.

There has been considerable consumer acceptance of presliced sausages, such as bologna, salami, etc., which are sold in the form of relatively small, conveniently sized packages, each package containing, as an example, a small predetermined quantity of sausages in the form of a fixed number of slices. The rapid increase in popularity and volume of such packaged sausage slices has, however, been accompanied by a number of difficulties and problems on the part of the meat packer. For example, in order to provide a predetermined number of slices of sausage in a package of given weight, it is essential that the processing of the sausage be such that the density, diameter, and other physical dimensions, as well as the surface appearance of the sausage, be carefully controlled. The reason for this is that the slicing is performed mechanically, and in high speed packaging, it is essential that the dimensional variations of the sausage be held to an absolute minimum. In the preparation of sausages by the meat packer, a sausage emulsion is inserted into a casing and cooked and/or smoked or otherwise processed. In order to control the size of the sausage carefully, it is necessary to use either a clear cellulosic casing of sufficient wall thickness to produce a dimensionally stable sausage or a fibrous casing composed of cellulosic fibers, preferably in the form of a paper, which are impregnated and held together by regenerated cellulose. Fibrous casings are most commonly used in the preparation of sausages where very little casing stretch can be tolerated.

Cellulosic sausage casings, both of the clear regenerated cellulose type and the fibrous type, are ordinarily supplied to the meat packer in the form of flattened cellulosic tubes about thirty inches in length. The meat packer ties a string around one end of the flattened tube (which is usually pre-soaked in water to make the tube more pliable) and places the open end of the tube over a sausage stuffing horn. The sausage emulsion is then fed through the stuffing horn into the casing to fill the tube substantially full. The open end of the filled tube is then twisted and another string tied around it to close the filled casing. The string at one end of the casing usually has a loop formed in it to provide a hanger for the sausage. The meat packer takes the filled sausage and hangs it in the smoke house by the loop on the closed end of the casing.

In past years, a number of types of automatic knotting and other casing closing machinery have been devised for the purpose of reducing the work done by the packer at the time of filling the casing with sausage. Machines have been produced which will tie knots in the casing material. These machines, however, have been of practical use only in connection with casings that are kept moist and pliable. Other machines have been devised for applying wire clips and for tying strings around the ends of casings. These machines have been expensive to operate and add substantially to the cost of the casing which is supplied to the packer. Furthermore, the machines which have tied knots or placed clips around the ends of casings have generally been of a type used at the packing house and thus could be afforded only by the largest packers. As a result, there has been considerable demand for the preparation of sausage casings for the production of large diameter sausages which casings are provided with an end enclosure and preferably with a suitable casing hanger by the casing manufacturer so that the casings are ready for use by the packer.

It is, therefore, one object of this invention to provide a new and improved method of closing an end of a cellulosic sausage casing having the form of a flattened tube.

Another object of this invention is to provide a new and improved method for closing the end of a flattened tube of clear regenerated cellulose casing or fibrous casing.

Still another object of this invention is to provide a new and improved method of closing the end of a clear regenerated cellulose casing or a fibrous casing and simultaneously applying a casing hanger to the closed end.

Still another object of this invention is to provide a novel product comprising a regenerated cellulose casing or fibrous casing in the form of a flattened tube having a novel end closure which may, if desired, have a casing hanger applied at the end closure.

A feature of this invention is the provision of a new and improved method of closing cellulosic sausage casings by pleating one end of the casing, compressing the pleated portion, forming a hole in the pleated portion free from cuts and tears, and riveting the pleated portion together at the hole.

Another feature of this invention is the provision of an improved method of closing a cellulosic sausage casing in which a clear regenerated cellulose casing or a fibrous casing in the form of a flattened tube is provided with a plurality of longitudinally extending pleats at one end, compressed at the pleated portion, and a casing hanger, preferably a plastic strap, applied to the closed end by a rivet or eyelet inserted through a hole in the pleated portion of the casing.

Another feature of this invention is the provision of an improved cellulosic sausage casing in the form of a flattened tube of clear regenerated cellulose casing or fibrous casing having a plurality of longitudinally extending pleats at one end compressed and secured together by rivet means inserted through a hole in the pleated portion which is free of cuts and tears.

Other objects and features of this invention will become apparent from time to time throughout the specification and claims as hereinafter related.

This invention is based upon our discovery of a new and improved process for closing the ends of cellulosic casings and the novel products resulting therefrom. In this process, a cellulosic casing in the form of a flattened tube of clear regenerated cellulose or a fibrous casing is provided with a plurality of longitudinally extending pleats at the end which is to be closed. The pleated portion is compressed and a hole is carefully formed therein, preferably by drilling, which is free from cuts and tears. A suitable rivet means, which may be a solid rivet or an eyelet, is inserted through the hole and compressed in a conventional manner to provide a rivet or eyelet head on each side of the pleated portion to secure the compressed pleated portion together. In a preferred form of the invention, a suitable casing hanger, such as a string or a strap, preferably of a high-tear-strength plastic such as polypropylene, is applied to the pleated portion of the casing and secured in place by the rivet means. If the process is carried out without the application of the hanger strap, then it is generally necessary to provide a soft washer at each end of the rivet means to prevent the head of the rivet means from cutting into the casing and causing it to tear upon stuffing.

Figure 2:
Figure 3:
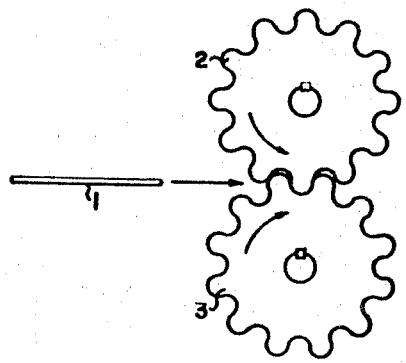
Figure 5:
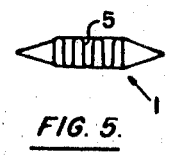
Figure 4:
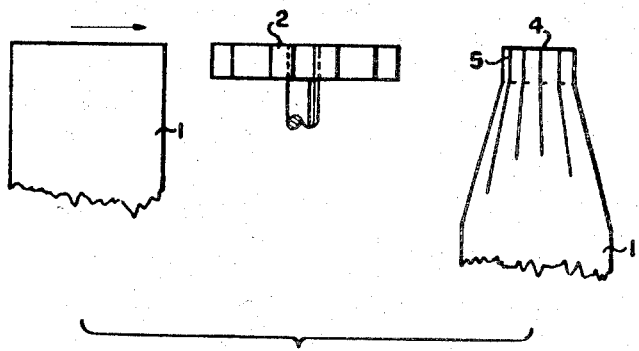
Figure 6:
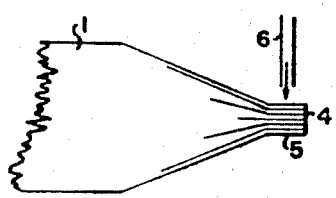
Figure 7:
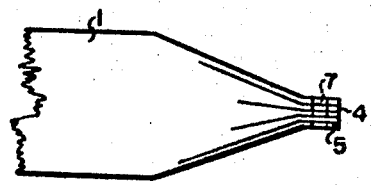
Figure 8:
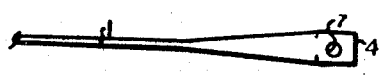
Figure 9:
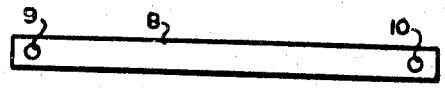
Figure 10:
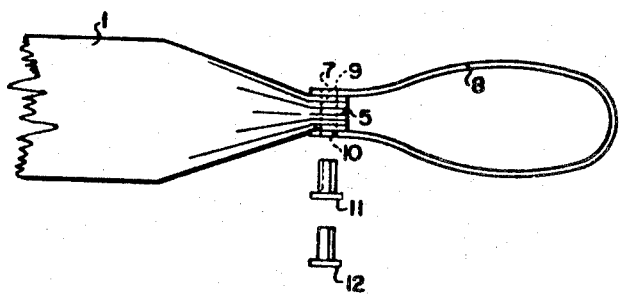
Figure 11:
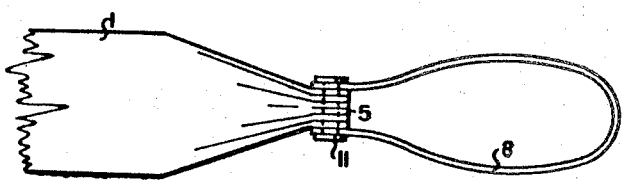

In the accompanying drawings, to be taken as a part of this specification, there is clearly and fully illustrated a preferred embodiment of the invention and illustrating the novel method used herein, in which drawings, FIG. 1 is a plan view of a flattened casing tube, FIG. 2 is an end view of a flattened casing tube, FIG. 3 is a diagrammatic view in elevation showing a flattened casing tube passing into a pair of pleating wheels, FIG. 4 is a top plan view, somewhat diagrammatic, showing the casing passing through the pleating wheels, FIG. 5 is an end view of the pleated casing, FIG. 6 is a diagrammatic view showing a hollow drill in position to drill a hole through the pleated end portion of the casing, FIG. 7 is a plan view of an end portion of the casing with a hole drilled through the pleated end portion, FIG. 8 is an elevation showing the hole drilled through the pleated end portion as shown in FIG. 7, FIG. 9 is a detail plan view of a strap for installation to the pleated end portion of the casing, FIG. 10 is a pre-assembly view showing the casing hanger strap positioned adjacent to the pleated end portion of the casing and an eyelet or rivet arranged for insertion through the hole in the strap and the pleated end portion of the casing for securing the same together, and FIG. 11 is a detail view of the end of the casing with strap and rivet or eyelet secured in place.

Referring to the drawings by numerals of reference, there is shown in FIG. 1 a piece of sausage casing 1 in the form of a flattened tube. This casing is either of clear regenerated cellulose or is a fibrous casing which is regenerated cellulose reinforced with a hemp fiber paper or similar fibrous reinforcement. In FIG. 2, an end view of the casing is shown. The wall thickness of the casing is so thin in relation to the width of the casing that only a single line is used to show the casing wall.

The end portion of casing 1 is passed through a pair of pleater wheels 2 and 3 as shown diagrammatically in FIGS. 3 and 4. The pleater wheels 2 and 3 have loosely fitting gear teeth around their respective peripheries and engage the end portion of the casing to form pleats therein. In FIG. 4, the casing is shown in position at the left of the pleater wheels in preparation for pleating. At the right of the pleater wheels, casing 1 is shown with end portion 4 pleated as shown by reference numeral 5. In FIG. 5, the loosely pleated end portion is shown in an end view prior to compression of the pleats.

After the casing is pleated at the end portion 4, pleated portion 5 is compressed as shown in FIG. 6 and a hole is drilled therein using a hollow drill 6 or similar drilling or punching device. It is preferred to use a hollow drill since it is capable of forming a hole in the casing that is completely free from cuts and tears. As will be described later, it is absolutely necessary that the hole formed in the pleated portion be free of any cuts and tears to prevent failure of the end closure.

In FIG. 7, casing 1 is shown with hole 7 formed in pleated portion 5 at the casing end 4 which is to be closed and provided with a casing hanger. The pleated end portion of the casing and hole 7 formed therein are shown in elevation in FIG. 8. In FIG. 9, there is shown a strap 8 with holes 9 and 10 at opposite ends. Strap 8 may be of any suitable material but is preferably of a high-tear-strength plastic such as polypropylene. Any suitable strap material could be used, however, for the desired purpose. Even a metal strap, with or without washers, could be used (to withstand high cooking temperatures) if the surface in contact with the casing were completely smooth.

In FIG. 10, strap 8 is shown with holes 9 and 10 positioned at opposite ends of hole 7 at pleated end portion 5 of casing 1. The strap is intended to be secured in place by eyelet 11 or rivet 12 shown in position below the casing strap. When the eyelet or rivet is positioned through holes 7, 9, and 10 and secured in place, the assembly obtained is that shown in FIG. 11. Strap 8 is secured to pleated end portion 5 by rivet 12 or eyelet 11. The strap functions to protect the pleated casing from being torn during formation of a head on the rivet or eyelet.

If desired, other strap materials can be used, e.g. fabric, leather, other plastic sheet materials, etc., than that described above. Also, a cord or string can be substituted for strap 8 and assembled exactly as shown in FIGS. 10 and 11 or looped through eyelet 11. In fact, the substitution of a cord or string for strap 8 would produce an assembly view substantially identical to FIG. 11, but with the ends of the string wrapped around the shank of rivet 12 or eyelet 11 and secured in place by the heads of the rivet or eyelet. It should also be noted that the riveting or eyeleting technique used herein for closing one end of the casing can be used exactly as described without any strap or cord applied to the casing.

In extensive field tests, at various packing houses, casings which were prepared as described above have been stuffed with sausage meat and the opposite end tied in a conventional manner and the sausages hung in a smokehouse for further processing. It has been found that the riveted or eyeleted closure is satisfactory and does not break or tear when the casing is stuffed with sausage meat. Also, the riveting or eyeleting of a strap or cord to the end of the casing provides a strong support for the sausage whereby the sausage can be hung in a smokehouse or other processing area. In extensive tests, it has been found that the casing can be closed and provided with a strap or cord as described above without any danger of casing failure only so long as the hole 7 which is formed in pleated end portion 5 of the casing is completely free of cuts and tears. If there are any cuts or tears formed in the casing at or adjacent to the hole 7, the casing will rupture during filling or the weight of the sausage will cause the eyelet or rivet to tear out when the sausage is hung in the smokehouse.

While we have described fully and completely a preferred embodiment of this invention as required by the patent laws, we wish it to be understood that within the scope of the appended claims this invention may be practiced otherwise than as specifically described herein.

What is claimed is:

1. A method of closing a sausage casing of clear regenerated cellulose or fiber reinforced regenerated cellulose in the form of a flattened casing which comprises, (a) forming a plurality of longitudinally extending pleats at one end of said flattened casing, (b) compressing the pleated portion, (c) forming a hole in said pleated portion free from cuts and tears, (d) positioning a casing hanger strap having a hole at each of its opposite ends adjacent to said hole in said pleated portion whereby each of the holes at the opposite ends of the strap are aligned with the hole in the pleated portion, (e) inserting a solid rivet or eyelet through said hole, and (f) compressing said rivet or eyelet to secure said compressed and pleated portion together and to secure said casing hanger thereto.

2. A method as defined in claim 1 in which said strap is of polypropylene.

References Cited

UNITED STATES PATENTS

| | | | |
|---|---|---|---|
| 1,189,917 | 7/1916 | Cobb | 227—61 |
| 1,800,101 | 4/1931 | Parker | 227—61 |
| 2,042,227 | 5/1936 | Hensel | 99—175 |
| 2,259,296 | 10/1941 | Cramer | 227—61 |
| 2,493,063 | 1/1950 | Frank et al. | 99—176 |
| 3,064,803 | 11/1962 | Eichin et al. | 99—175 X |

HYMAN LORD, *Primary Examiner.*